(12) United States Patent
Kenkre et al.

(10) Patent No.: US 10,885,526 B2
(45) Date of Patent: Jan. 5, 2021

(54) MONITORING FLOWS IN AN EVOLVING TRANSACTION NETWORK USING DYNAMIC RULES

(71) Applicant: International Business Machines Corporation, Armonk, NY (US)

(72) Inventors: Sreyash Kenkre, Bangalore (IN); Raghuram Krishnapuram, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 13/655,880

(22) Filed: Oct. 19, 2012

(65) Prior Publication Data
US 2014/0114841 A1    Apr. 24, 2014

(51) Int. Cl.
*G06Q 40/00* (2012.01)
*G06Q 20/40* (2012.01)

(52) U.S. Cl.
CPC ......... *G06Q 20/4016* (2013.01); *G06Q 40/00* (2013.01)

(58) Field of Classification Search
CPC ..... G06Q 40/00; G06Q 40/04; G06Q 20/4016
See application file for complete search history.

(56) References Cited

U.S. PATENT DOCUMENTS

| 7,620,596 | B2 | 11/2009 | Knudson et al. |
| 7,708,638 | B2 | 5/2010 | Enzminger et al. |
| 7,721,336 | B1 | 5/2010 | Adjaoute |
| 7,769,682 | B2 | 8/2010 | Moudgal |
| 7,805,362 | B1 | 9/2010 | Merrell et al. |
| 8,095,441 | B2 | 1/2012 | Wu et al. |
| 2002/0156747 | A1* | 10/2002 | Reiter ............ H04L 63/12 705/76 |
| 2005/0222929 | A1* | 10/2005 | Steier ............ G06Q 40/00 705/35 |
| 2005/0257827 | A1 | 11/2005 | Gaudiana et al. |
| 2008/0086409 | A1 | 4/2008 | Moorman et al. |

(Continued)

FOREIGN PATENT DOCUMENTS

JP    2010225040    10/2010

OTHER PUBLICATIONS

NPL1: Transaction Processing: Past, Present, and Future, IBM, Sep. 29, 2012 (Year: 2012).*

(Continued)

*Primary Examiner* — Mike Anderson
(74) *Attorney, Agent, or Firm* — Ference & Associates LLC (57) ABSTRACT

Methods and arrangements for monitoring and flagging distinct flows in an evolving network. There is identified a locality comprising at least two nodes in a graph of nodes and edges, wherein the edges represent interactions between nodes. At least one target source-destination node pair is identified in the locality for monitoring, and at least one monitoring rule is generated. An interaction is flagged upon a detected violation of at least one monitoring rule, and there is updated, in response to the detected rule violation, at least one of: the identified locality; the at least one target source-destination pair; and the at least one monitoring rule.

13 Claims, 3 Drawing Sheets

(56) References Cited

U.S. PATENT DOCUMENTS

2010/0004981 A1   1/2010  Katz et al.
2013/0018796 A1*  1/2013  Kolhatkar .............. G06Q 20/28
                                                                          705/44

OTHER PUBLICATIONS

Online website at: http://www.svivot.com/main/Applications/AMLInvestigate.htm., Anti-Money Laundering Investigation, "SN-Sphere(TM) as a Tool in Detecting and Investigating Money Laundering Activities," available as of May 24, 2012, 6 pages.

* cited by examiner

MONITORING FLOWS IN AN EVOLVING TRANSACTION NETWORK USING DYNAMIC RULES

BACKGROUND

Consumers and organizations alike have benefited greatly from the flexibility and ease of use provided by electronic financial transfers. The movement of assets between different physical locations has thus become a much more manageable exercise than ever was previously the case, especially with the electronic transfer mechanisms themselves becoming ever more efficient. However, it comes as little surprise that an undesirable side effect of these developments has been an increase in opportunities for money laundering, exploiting those very mechanisms and networks that otherwise are in place to facilitate legitimate transactions.

Generally, governments, law enforcement organizations and other entities have recognized some common characteristics of money laundering transactions that greatly facilitate their detection. As such, large monetary transfers above a predetermined threshold, whether such transfers are legal or not, are normally reported by banks to the government or a law enforcement organization when they occur. However, to the extent that this may well prove a viable deterrent for money laundering, groups engaged in such activities can and do find ways to work around reporting (or other) restrictions. For instance, a group involved in money laundering may well use a large number of dummy accounts or intermediaries to transfer a larger amount by splitting it into much smaller parts that each fall short of a mandated threshold for flagging or reporting.

In view of the work-arounds often sought by organizations engaging in money laundering, it can be appreciated that there exist ongoing efforts to effect ever more precise and sophisticated methods of detecting even those work-arounds. However, suitable guidelines or criteria for discerning even a reasonably manageable or viable candidate set of potentially illicit transactions have proven to be far from easy to develop.

Outside of financial transactions, it can also be appreciated that there exist other complex networks with a vast number of parties and transactions, where it can be useful to discern and act upon prominent transactions that fulfill certain predetermined criteria. Such networks include, but by no means are limited to: mobile call networks; email contact networks; professional and social networks; and networks modeling the spread of diseases. As with money laundering, the development of efficient guidelines and criteria for narrowing down candidate transactions (or other actions) for certain "flagging" has proven to be highly elusive.

BRIEF SUMMARY

In summary, one aspect of the invention provides a method comprising: identifying a locality comprising at least two nodes in a graph of nodes and edges, wherein the edges represent interactions between nodes; identifying, in the locality, at least one target source-destination node pair for monitoring; generating at least one monitoring rule with respect to the monitoring; flagging an interaction upon a detected violation of at least one monitoring rule; and updating, in response to the detected rule violation, at least one of: the identified locality; the at least one target source-destination pair; and the at least one monitoring rule.

Another aspect of the invention provides an apparatus comprising: at least one processor; and a computer readable storage medium having computer readable program code embodied therewith and executable by the at least one processor, the computer readable program code comprising: computer readable program code configured to identify a locality comprising at least two nodes in a graph of nodes and edges, wherein the edges represent interactions between nodes; computer readable program code configured to identify, in the locality, at least one target source-destination node pair for monitoring; computer readable program code configured to generate at least one monitoring rule with respect to the monitoring; computer readable program code configured to flag an interaction upon a detected violation of at least one monitoring rule; and computer readable program code configured to update, in response to the detected rule violation, at least one of: the identified locality; the at least one target source-destination pair; and the at least one monitoring rule.

An additional aspect of the invention provides a computer program product comprising: a computer readable storage medium having computer readable program code embodied therewith, the computer readable program code comprising: computer readable program code configured to identify a locality comprising at least two nodes in a graph of nodes and edges, wherein the edges represent interactions between nodes; computer readable program code configured to identify, in the locality, at least one target source-destination node pair for monitoring; computer readable program code configured to generate at least one monitoring rule with respect to the monitoring; computer readable program code configured to flag an interaction upon a detected violation of at least one monitoring rule; and computer readable program code configured to update, in response to the detected rule violation, at least one of: the identified locality; the at least one target source-destination pair; and the at least one monitoring rule.

A further aspect of the invention provides a method comprising: identifying a locality comprising at least two nodes in a graph of nodes and edges, wherein the edges represent financial transactions between nodes; identifying, in the locality, at least one target source-destination node pair for monitoring; generating at least one money laundering rule with respect to the monitoring; flagging an interaction upon a detected violation of at least one money laundering monitoring rule; and updating, in response to the detected rule violation, at least one of: the identified locality; the at least one target source-destination pair; and the at least one money laundering rule.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made herebelow to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 3, whether on a server computer, a client computer, a node computer in a distributed network, or any combination thereof.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In accordance with at least one embodiment of the invention, there are broadly contemplated herein methods and arrangements for facilitating the detection of prominent transactions in complex networks, such as money laundering transactions. Generally, there is broadly contemplated the monitoring and flagging distinct flows or transactions in an evolving network. With candidate flows or transactions detected, they can be referred onward for further investigation. Detection takes place quickly and referral of candidate transactions takes place in realtime. A wide variety of details and parameters can be considered in pruning to a manageable and viable candidate set of transactions.

As such, broadly contemplated herein, in accordance with at least one embodiment of the invention, are methods and arrangements for effectively computing transaction parameters, such as maximum flow (e.g., monetary flow) between two nodes in a network, wherein the edges and nodes in the network may well evolve on a continual basis by way of the addition or deletion of nodes or edges. Consideration is also given to whether parameters cross predetermine threshold values as the network does evolve.

In accordance with at least one embodiment of the invention, the aforementioned parameters relate only to a small fraction of the total number nodes and edges, particularly nodes and edges that are not too far away in the network from one another. The parameters involved can relate to upper and lower bounds in the form of small and easily computed quantities, and to a determination as to whether parameter values cross such bounds.

The disclosure now turns to a more focused discussion of embodiments of the invention. It should be understood that while embodiments of the invention relate to a very wide variety of complex networks with large numbers of nodes and edges, with edges representing transactions between the nodes (examples of which networks are mentioned in the Background section hereinabove), for the purposes of illustration a money laundering application will be discussed. It should thus be understood that similar ideas and principles as discussed herein with respect to the illustrative example of money laundering can be applied to problems addressed in a very wide variety of other types of networks.

It can be appreciated, in accordance with at least one embodiment of the invention, that a very large number of transactions likely is involved. Actual parameter values may only depend, in practice, on a very small fraction of the nodes and edges in a graph or network and yet, with a constantly evolving network, it is difficult to determine, until a later point in time, whether a particular node or edge affects the value of the parameter. This can be thought of as a "needle in the haystack" problem, and conventionally all nodes and edges are monitored so that potentially decisive nodes or transactions are not missed.

In accordance with at least one embodiment of the invention, in an illustrative example involving money laundering, one encountered problem might be that the transfer of the money is staggered in time, could involve credit transfers that may confuse any money trail tracking based on ordering the events in time, and could employ numerous intermediaries that add immeasurable complexity to the dynamics of tracking the money.

As such, broadly contemplated herein, in accordance with at least one embodiment of the invention, are systems and methods for detecting money laundering, by monitoring money flows in an evolving money transaction network, by testing for violations of a set of evolving rules wherein:

the transaction network evolves over time via the addition or deletion of accounts or transactions between accounts;

estimates of good bounds on the money flow can be computed efficiently, with respect to the domain at hand; and rules include comparisons of flow value with estimates of one or more bounds.

More generally, in accordance with at least one embodiment of the invention, a system and method can be applied for monitoring any parameter of an evolving network, by testing for violation of an evolving set of rules, provided an estimate of the value of such a parameter can be computed and stored efficiently.

In accordance with at least one embodiment of the invention, a local search-based heuristic is provided for detecting if flows cross a threshold, and the heuristic may be implemented in real time. As a result, the number of rules to be updated and/or tested at each monitoring step is small. The heuristic can be implemented in a distributed computation setting, and can work (in the case of money laundering detection) in the presence of transactions staggered in time and credit transactions.

In accordance with at least one embodiment of the invention, domain knowledge is captured and employed, which helps refine an understanding of helpful target parameters and their values. Further refinement can follow from permitting a user to specify which part of a network can be searched. Additionally, related information about accounts can be used, which itself may be contained as user-specified domain knowledge, or can derive from other transaction graphs such as social networks, email networks, call graphs, etc.

In accordance with at least one embodiment of the invention, information is provided about accounts (or nodes) in a transaction network, as well as transactions (or edges) between nodes. Also provided is transaction information, relative to two accounts involved in the transaction (i.e., the amount, the direction and time of the transaction, etc.), as well as a list of network parameters to be monitored (which, in the case of money laundering, can correspond to money flow values).

In accordance with at least one embodiment of the invention, a transaction (as input) can correspond to deletion (see below) of an earlier seen transaction. Transactions, generally, can be modeled as a directed or undirected graph, with the nodes representing accounts and the edges representing transactions; such a graph is referred to herethroughout as a "transaction network".

By way of clarification, when an edge in the graph is deleted, rules can be updated to reflect the deletion, and the modified graph can still be monitored. In the illustrative case of money transfers, a transaction is not so much deleted as removed from consideration for monitoring. For instance, users may choose to monitor only recent transactions (e.g., they may not be interested in transactions that occurred more than a year back), and thus edges corresponding to older transactions can be removed from the graph.

Figure 1:
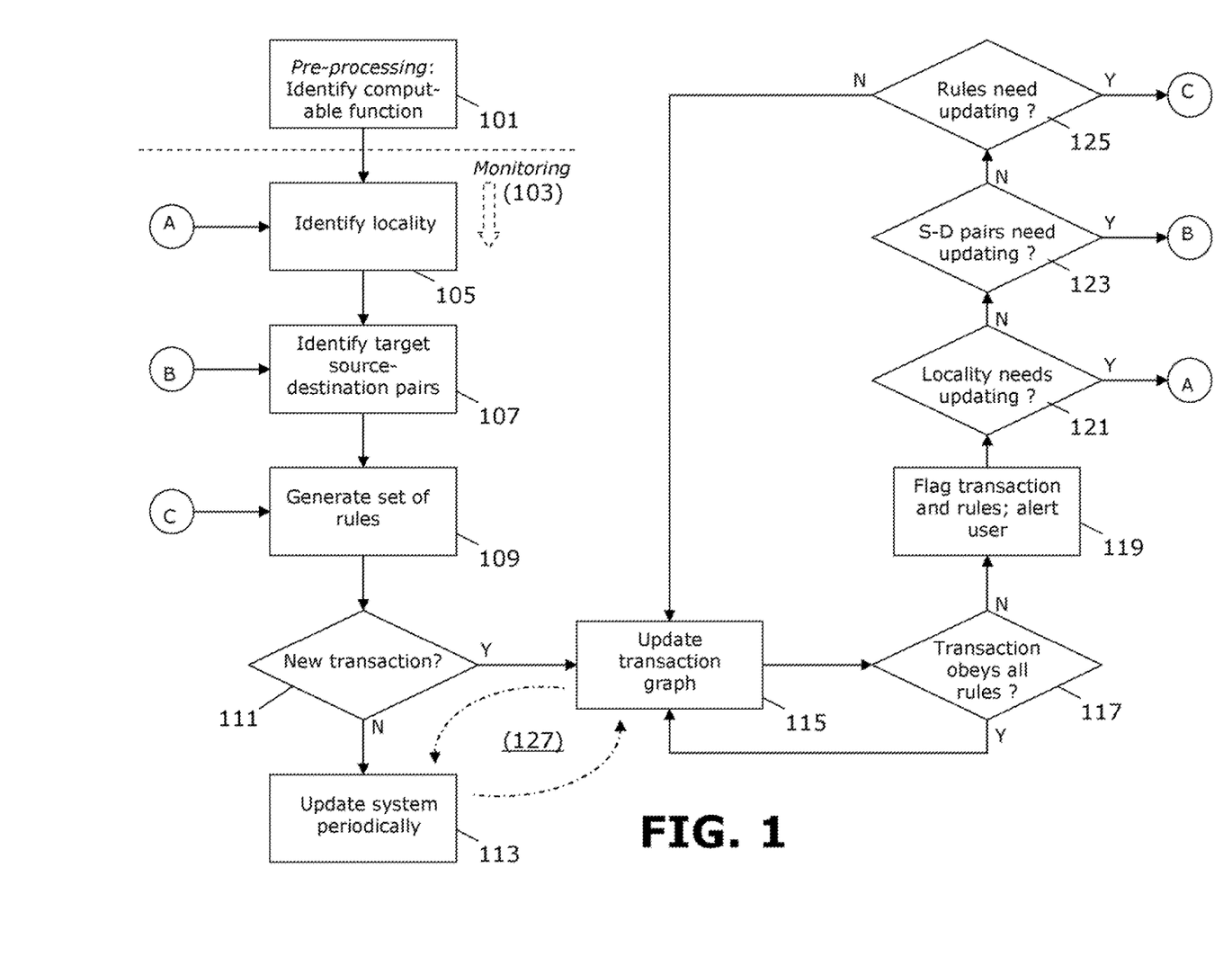
FIG. 1 schematically illustrates an illustrative process.

The disclosure now turns to a discussion of specific process steps in an illustrative process according to at least one embodiment of the invention, and as illustrated schematically in FIG. 1.

Generally, in a process according to at least one embodiment of the invention, in a preprocessing stage (or step) 101, from a specification of parameters and domain knowledge, an efficiently computable function is identified which will be used for tracking the parameter of interest. In a monitoring stage 103, the following five steps take place: locality identification 105; target source-destination identification 107; rule generation 109; transaction and real time computation 115; and system updates 117-125 and/or 113 (any and all of which may be periodic or predetermined to take place at given times).

In the preprocessing step 101, in accordance with at least one embodiment of the invention, for each parameter to be monitored, based on domain knowledge, suitable functions of the nodes and edges of the transaction network are identified that can be computed efficiently. In the present illustrative example of monitoring money flows between nodes in the network, the current value of the transactions on the edges is designated to correspond to weights on the edges, and then a minimum cut (or minimum capacity cut) between the nodes is determined. Particularly, the minimum cut corresponds to (and can be defined as) a tight upper bound on the value of the flow between the nodes in question in the network.

In accordance with at least one embodiment of the invention, in a monitoring stage, the locality is first identified (105), wherein a locality can be considered as a set of accounts (and thus need not necessarily correspond to a given geographical location). In other words, a locality is independent of transactions whereas, if a user wishes to monitor transactions that occur between a given set of accounts then such a set can be considered a "locality". (The locality can also encompass all accounts in a graph, as discussed herebelow.) After identification of target source-destination pairs (107), wherein the pairs can be specified by a user and/or, as discussed below, can encompass all pairs of accounts in a locality, a set of rules is generated (109), which encompasses an efficient computation on the bounds of flow, along with a test if a current value is sufficiently close to this (as determined quantitatively in a manner to be described in more detail below).

Generally, in accordance with at least one embodiment of the invention, the system is updated periodically 113 to the extent that no new transactions (111) come in. Otherwise, in a looped set of steps in accordance with at least one embodiment of the invention, for every new transaction (111) where money is transferred from account X to account Y:

the transaction graph is updated (115);

if (117) the transaction obeys all of the rules in a current rule set, return to the step of updating the transaction graph;

if not, flag this transaction and the violated rules, and alert the user for further action (119);

check if the locality needs updating (121) and, if so, break the loop and return to the "identify locality" step 105;

check if the source-destination pairs need updating (123) and, if so, break the loop and return to the step 107 of "identify target source-destination pairs";

check if any of the current rules need updating (125) and, if so, break the loop and return to the rule generation step 109;

otherwise, return to the step 115 of updating the transaction graph while periodically (127) updating the system 113. (Such periodic updates can include, but need not be limited to: deletion of old and/or outdated transactions in which the user no longer has interest; deletion of accounts which are no longer active and are of no interest to the user; changes in the accounts that the user is monitoring; updates in the locality or other information relating accounts; and other changes that the user wants to implement.)

In accordance with at least one embodiment of the invention, out of the monitoring steps mentioned above, steps 105-109 are executed a relatively small number of times while the checking of rules in the subsequent "loop" steps (115-125) is undertaken very rapidly. This can be accomplished in that the locality identification (105) restricts most computation to a much smaller sized problem than the entire transaction graph. Further, the target source-destination identification (107) permits a focusing of attention on a smaller set of nodes, rather than all pairs of nodes. This also allows the user to gain control over whom to observe, thereby capturing domain knowledge. Additionally, a set of rules can be generated (109) that can be checked very rapidly, while updates to the system (113) need not be very frequent. Yet further, as any transaction can affect only the locality in which it occurs (or in two localities if the source and destination are not in the same locality), then transaction graph updates (115), if any, are restricted solely to the one or more affected localities. This reduces the number of rules to be updated per transaction. Accordingly, unless there are a large number of suspect transactions, the system may be implemented to run very rapidly.

By way of further details of steps in accordance with at least one embodiment of the invention, in accordance with a locality identification step 105, it can be noted that the size of money laundering networks may involve a few thousand accounts, while full transaction graphs have several orders of magnitude larger number of nodes. Thus, groups of nodes are identified for analysis, wherein nodes outside of the identified group do not present money laundering activities with respect to the nodes in within the identified group. Previous history or domain knowledge can be employed for identification of the "localities". Alternatively, there may be defined a large radius "R", representing a connective distance (or distance defined by "hops") between nodes, wherein around each node a "ball" of radius R in the transaction network is reviewed, in which the nodes falling within the "ball" are considered to constitute the locality for each node.

In a source-destination identification step 107, in accordance with at least one embodiment of the invention, suspect money laundering activity with respect to one or more accounts can be surmised by checking previous history or by way of user knowledge. Thus, it is possible that there may only be interest in a few accounts that have the potential to be involved in money laundering activities. As mentioned above, the user may specify these explicitly, with the source-destination pairs being considered to be in the same locality (else the system may take every ordered pair of vertices in each locality as suspect money launderers). It is possible to use groups of accounts for source and destination pairs, simply by introducing dummy accounts that transfer money to these accounts. In indicating that $\{v_1, v_2, \ldots, v_k\}$ are sources in the same laundering network, a new node, u, is introduced, along with transaction edges $uv_i$ with the same amount of money as the amount in account $v_i$ for each i.

In rule generation (109) and testing (115-125), in accordance with at least one embodiment of the invention, a computation as follows is performed for each source-destination pair. Let u, v represent source-destination pairs of interest, and let G be the graph induced by the locality of u,v on the transaction graph T. A capacity is given, equal to the transaction amount, to each transaction edge in G. A minimum capacity cut from u to v in the graph is computed. Let A and B denote the sets of vertices on the two sides of this cut, with u in A and v in B, and let c be the capacity of this cut. Thence store the tuple (u,v,A,B,c).

Thence, in accordance with at least one embodiment of the invention, let t represent the minimum amount that, if transferred between u and v using small transactions, induces the user to monitor money flows between u and v. Let M be the total large amount which, when transferred without reporting, constitutes an instance of money laundering. For each (u,v,A,B,c) tuple that is stored, if c>=t, output (u,v,A,B,c) as a rule. To then test for a rule (u,v,A,B,c), for any incoming transaction (x,y) of amount m, a test is conducted as to whether x is in A and y is in B, and m+c is less than M. If m+c is at least M, then the rule (u,v,A,B,c) is violated. If the transaction belonged to the same minimum cut set as the current set for (u,v), recompute the minimum capacity (u,v) cut in their locality. (This can be run in the background, but before the next transaction in the same locality.) If the minimum capacity cut has increased, update the system by generating the rules again for pairs which have the edge (x,y) in their locality. (This can also be done in background, but before the next transaction in the same locality.)

In accordance with at least one embodiment of the invention, in a context of money laundering detection, generally there is interest in a transaction only if it is of a small enough value to escape tax and banking regulations. Whenever there is a new transaction, all rules are tested for, but this may be optimized by using essentially any suitable addressing or hashing scheme, which immediately identifies a locality to which the transaction belongs. The rules that the transaction affects are then reviewed. For testing the rules, a main algorithmic problem is to identify if an element "x" belongs to a set S (to test if the accounts belong to either side of the cut, etc). Essentially any suitable optimized data structure may be used for this. For instance, for numbered accounts, a binary search may be used with logarithmic time with respect to a size of the locality graph, which can be expressed as the number of nodes in a set S. In other words, if (u,v,A,B,c) is a rule, then S will correspond to A for testing membership within A, and B for testing membership within B.

In accordance with at least one embodiment of the invention, temporal evolution is accounted for. As such, the union of all transactions until a given time is inputted, and analyses are undertaken for this entire graph. In other words, when this graph is constructed for the very first time, all transactions encountered up to that point are aggregated, with the graph then constructed in the computer system such that methods as described herein can then be implemented thereupon. Once the graph indeed is constructed, any new transaction becomes an incremental addition of an edge to the graph, such that the entire graph does not need to be recomputed. Pre-computations for the full graph are periodically updated. Transactions older than a predetermined timepoint may also be deleted. Further, if any transactions or nodes are deleted, the system can be updated by re-computing the localities, as well as the rules for the localities affected by the deletions.

In accordance with at least one embodiment of the invention, rules may be sorted and then tested in decreasing order of the cut value, thus permitting knowledge of flagged rules (if any) more rapidly. These can then be tested for an increase in minimum cut values in parallel with the rule testing, possibly on a different computing machine. The rule updating may be more frequent initially, as the graph evolves, and relatively slower later on. However, initially, the graph is sparse, so the minimum cut computations may run faster. Only the minimum capacity cut in the network may be computed, whereupon there is no attempt to trace the flow of money in the network (i.e., there is no explicit use of network flows or network pre-flows). Thus, there is no need for reviewing transactions staggered in time and/or credit transactions. For the locality identification, data may be used from call-data records, email records, social or professional networks or other such knowledge that helps identify the accounts that correspond to people who are connected.

In accordance with at least one embodiment of the invention, it can be noted that the total amount of money transferred from one account to another cannot exceed the capacity of the cut between them. Adding edges can only increase the value of the minimum cuts. Thus, there is only a need to keep track of one minimum cut, and the relatively rare transaction that increases its value.

Figure 2:
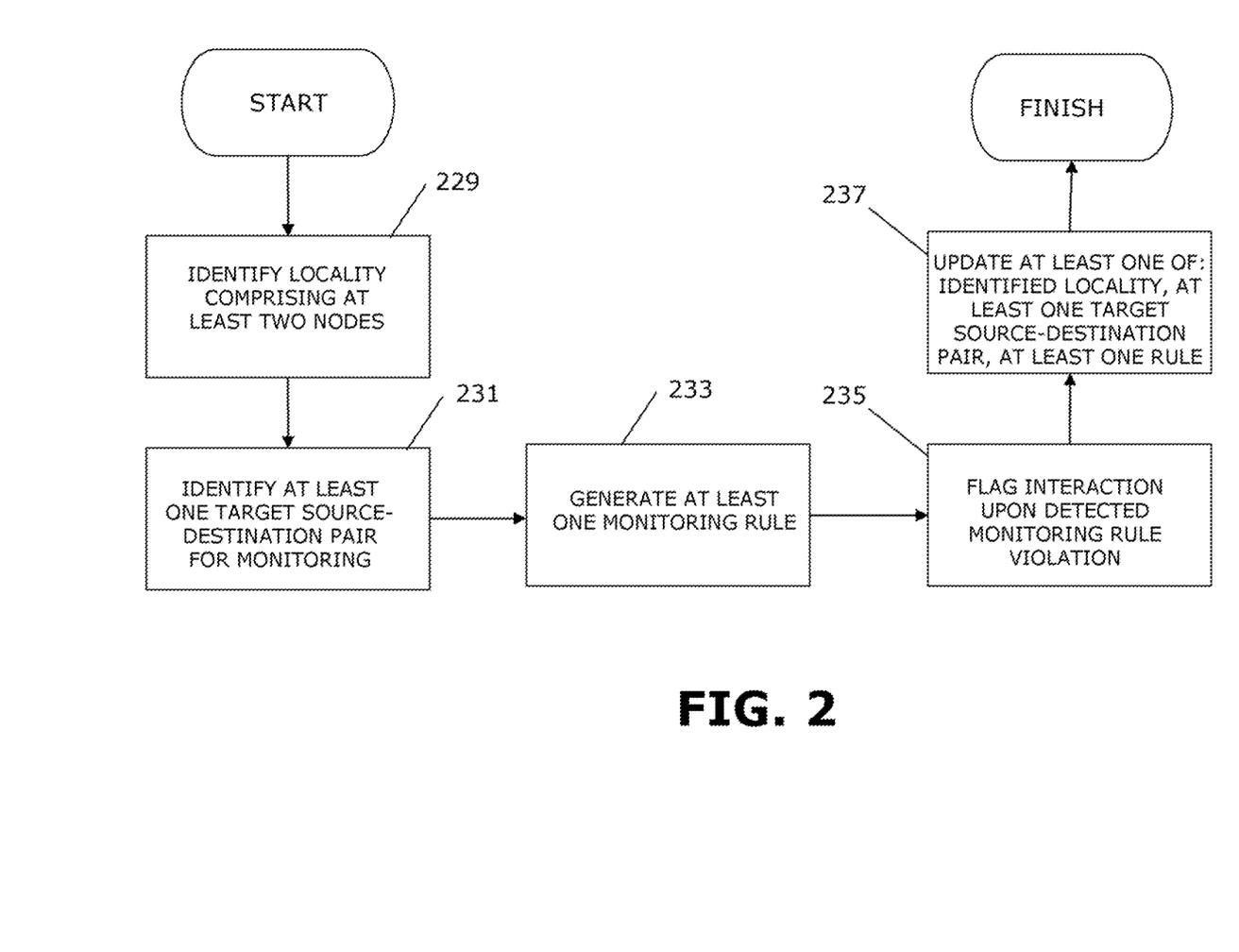
FIG. 2 sets forth a process more generally for monitoring and flagging distinct flows in an evolving network.

FIG. 2 sets forth a process more generally for monitoring and flagging distinct flows in an evolving network, in accordance with at least one embodiment of the invention. It should be appreciated that a process such as that broadly illustrated in FIG. 2 can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way a processing unit or units and system memory such as those indicated, respectively, at 16' and 28' in FIG. 3.

As shown in FIG. 2, in accordance with at least one embodiment of the invention, a locality is identified comprising at least two nodes in a graph of nodes and edges, wherein the edges represent interactions between nodes (229). At least one target source-destination node pair is identified in the locality for monitoring (231), and at least one monitoring rule is generated (233). An interaction is flagged upon a detected violation of at least one monitoring rule (235) and, there is updated, in response to the detected rule violation, at least one of: the identified locality; the at least one target source-destination pair; and the at least one monitoring rule (237).

Figure 3:
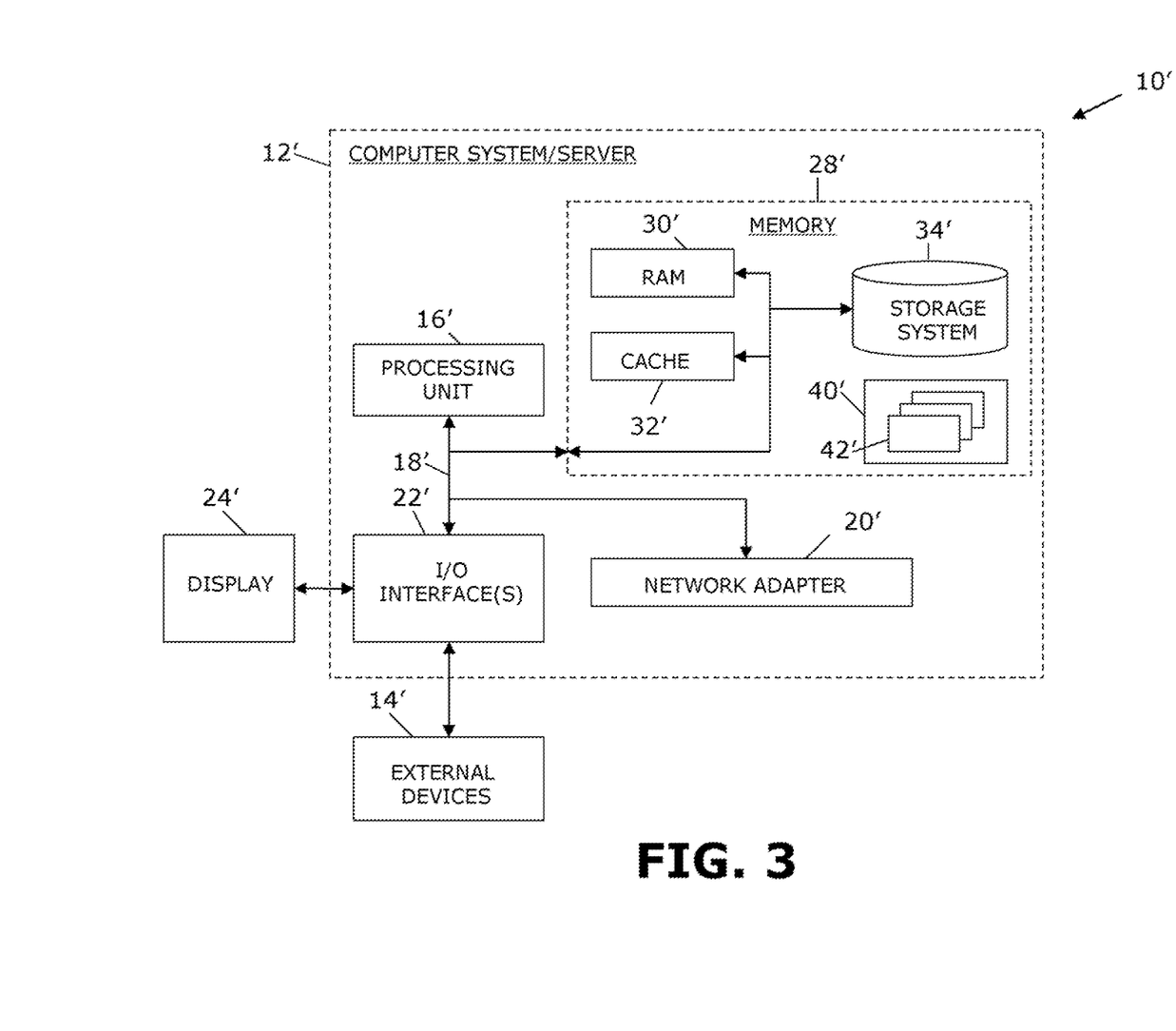
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as JAVASCRIPT®, Smalltalk, VISUAL C++® or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). JAVASCRIPT is a registered trademark of Oracle America, Inc. in the United States and other countries. VISUAL C++ is a registered trademark of Microsoft Corporation in the United States and other countries.

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:

utilizing one or more processors to execute a program of instructions configured to:

identifying at least one financial transaction as being indicative of money laundering by monitoring money flows into and out of a set of target accounts in an evolving money transaction network, thereby reducing a number of transactions to monitor, wherein the identifying comprises implementing a local search-based heuristic across a distributed cloud computing environment, wherein the local search-based heuristic comprises a user providing information regarding the set of target accounts, transactions between the set of target accounts, and a list of network parameters to be monitored, the identifying being performed in view of the local search-based heuristic and comprising:

identifying, for each of the list of network parameters, functions of nodes and edges within a graph representing the money transaction network, wherein the identified functions comprise functions computed efficiently by utilizing a small number of computations across the distributed cloud computing environment;

identifying a locality comprising the set of target accounts depicted as a set of nodes in the graph, wherein the locality is identified via identifying nodes within a predetermined connective distance of a core node, wherein the edges represent financial transactions between nodes and wherein the edges are weighted based upon a value of the financial transaction, wherein the locality represents a set of nodes identified as possibly engaging in money laundering activities and nodes outside the locality do not present money laundering activities;

identifying, in the locality, at least one target source-destination node pair for monitoring based upon the weighted value of the financial transactions between accounts represented by the node pair at least meeting a predetermined threshold, wherein the at least one target source-destination node pair is specified by a user in a display;

generating, utilizing the functions and for the monitoring, at least one rule relating to money laundering for the identified at least one target source-destination node pair, wherein the generating at least one rule comprises assigning a capacity equal to a monetary transaction value to each transaction between a node pair and computing a minimum capacity cut value between the at least one target source-destination node pair, wherein the minimum capacity cut value corresponds to an upper bound of a monetary value of transactions flowing between the at least one target source-destination node pair; and flagging, utilizing the functions, at least one incoming financial transaction based upon detecting the at least one incoming financial transaction violates the at least one rule, wherein detecting the at least one incoming financial transaction violates the at least one rule comprises identifying that the nodes of the at least one incoming financial transaction corresponding to nodes of the at least one target source-destination node pair and that the sum of the transaction amount of the at least one incoming financial transaction and the minimum capacity cut value for the target source-destination node pair has exceeded a monetary amount previously identified as constituting money laundering;

updating, in response to the detected rule violations: the nodes and edges in the identified locality, the at least one target source-destination pair to be monitored, and the cut value of the at least one rule; and iteratively updating the at least one rule based upon a response to the detected rule violation and using the updated at least one rule in the detecting.

2. The method according to claim 1, wherein said identifying of a set of nodes comprises deriving a set of nodes based on at least one of: user input; historical data; and domain knowledge.

3. The method according to claim 1, wherein said identifying of at least one target source-destination node pair comprises identifying at least one user-specified pair.

4. The method according to claim 1, wherein said identifying of at least one target source-destination node pair comprises consulting historical data.

5. The method according to claim 1, wherein said generating comprises defining a minimum capacity cut between nodes in a target source-destination node pair.

6. The method according to claim 5, wherein said generating comprises creating a data tuple which includes at least one member selected from the group consisting of: a capacity of the minimum capacity cut; and sets of vertices on either side of the minimum capacity cut.

7. An apparatus comprising:

at least one processor; and a non-transitory computer readable storage medium having computer readable program code embodied therewith and executable by the at least one processor, the computer readable program code comprising:

computer readable program code configured to identify at least one financial transaction as being indicative of money laundering by monitoring money flows into and out of a set of target accounts in an evolving money transaction network, thereby reducing a number of transactions to monitor, wherein the identifying comprises implementing a local search-based heuristic across a distributed cloud computing environment, wherein the local search-based heuristic comprises a user providing information regarding the set of target accounts, transactions between the set of target accounts, and a list of network parameters to be monitored, the identifying being performed in view of the local search-based heuristic and comprising:

computer readable program code configured to identify, for each of the list of network parameters, functions of nodes and edges within a graph representing the money transaction network, wherein the identified functions comprise functions computed efficiently by utilizing a small number of computations across the distributed cloud computing environment;

computer readable program code configured to identify a locality comprising the set of target accounts depicted as a set of nodes in the graph, wherein the locality is identified via identifying nodes within a predetermined connective distance of a core node, wherein the edges represent financial transactions between nodes and wherein the edges are weighted based upon a value of the financial transaction, wherein the locality represents a set of nodes identified as possibly engaging in money laundering activities and nodes outside the locality do not present money laundering activities;
computer readable program code configured to identify, in the locality, at least one target source-destination node pair for monitoring based upon the weighted value of the financial transactions between accounts represented by the node pair at least meeting a predetermined threshold, wherein the at least one target source-destination node pair is specified by the user in a display;
computer readable program code configured to generate, utilizing the functions and for the monitoring, at least one rule relating to money laundering for the identified at least one target source-destination node pair, wherein the generating at least one rule comprises assigning a capacity equal to a monetary transaction value to each transaction between a node pair and computing a minimum capacity cut value between the at least one target source-destination node pair, wherein the minimum capacity cut value corresponds to an upper bound of a monetary value of transactions flowing between the at least one target source-destination node pair; and
computer readable program code configured to flag, utilizing the functions, at least one incoming financial transaction based upon detecting the at least one incoming financial transaction violates the at least one rule, wherein detecting the at least one incoming financial transaction violates the at least one rule comprises identifying that the nodes of the at least one incoming financial transaction corresponding to nodes of the at least one target source-destination node pair and that the sum of the transaction amount of the at least one incoming financial transaction and the minimum capacity cut value for the target source-destination node pair has exceeded a monetary amount previously identified as constituting money laundering;
computer readable program code configured to update, in response to the detected rule violations: the nodes and edges in the identified locality, the at least one target source-destination pair to be monitored, and the cut value of the at least one rule; and
computer readable program code that iteratively updates the at least one rule based upon a response to the detected rule violation and using the updated at least one rule in the detecting.

8. A computer program product comprising:
a non-transitory computer readable storage medium having computer readable program code embodied therewith, the computer readable program code comprising:
computer readable program code configured to identify at least one financial transaction as being indicative of money laundering by monitoring money flows into and out of a set of target accounts in an evolving money transaction network, thereby reducing a number of transactions to monitor, wherein the identifying comprises implementing a local search-based heuristic across a distributed cloud computing environment, wherein the local search-based heuristic comprises a user providing information regarding the set of target accounts, transactions between the set of target accounts, and a list of network parameters to be monitored, the identifying being performed in view of the local search-based heuristic and comprising:
computer readable program code configured to identify, for each of the list of network parameters, functions of nodes and edges within a graph representing the money transaction network, wherein the identified functions comprise functions that can be computed efficiently by utilizing a small number of computations efficiently across the distributed cloud computing environment;
computer readable program code configured to identify a locality comprising the set of target accounts depicted as a set of nodes in the graph, wherein the locality is identified via identifying nodes within a predetermined connective distance of a core node, wherein the edges represent financial transactions between nodes and wherein the edges are weighted based upon a value of the financial transaction, wherein the locality represents a set of nodes identified as possibly engaging in money laundering activities and nodes outside the locality do not present money laundering activities;
computer readable program code configured to identify, in the locality, at least one target source-destination node pair for monitoring based upon the weighted value of the financial transactions between accounts represented by the node pair at least meeting a predetermined threshold, wherein the at least one target source-destination node pair is specified by the user in a display;
computer readable program code configured to generate, utilizing the functions and for the monitoring, at least one rule relating to money laundering for the identified at least one target source-destination node pair, wherein the generating at least one rule comprises assigning a capacity equal to a monetary transaction value to each transaction between a node pair and computing a minimum capacity cut value between the at least one target source-destination node pair, wherein the minimum capacity cut value corresponds to an upper bound of a monetary value of transactions flowing between the at least one target source-destination node pair; and
computer readable program code configured to flag, utilizing the functions, at least one incoming financial transaction based upon detecting the at least one incoming financial transaction violates the at least one rule, wherein detecting the at least one incoming financial transaction violates the at least one rule comprises identifying that the nodes of the at least one incoming financial transaction corresponding to nodes of the at least one target source-destination node pair and that the sum of the transaction amount of the at least one incoming financial transaction and the minimum capacity cut value for the target source-destination node pair has exceeded a monetary amount previously identified as constituting money laundering;
computer readable program code configured to update, in response to the detected rule violations: the nodes and edges in the identified locality, the at least one target source-destination pair to be monitored, and the cut value of the at least one rule; and
computer readable program code that iteratively updates the at least one rule based upon a response to the detected rule violation and using the updated at least one rule in the detecting.

9. The computer program product according to claim 8, wherein said computer readable program code is configured to identify a set of nodes via deriving a set of nodes based on at least one of: user input; historical data; and domain knowledge.

10. The computer program product according to claim 8, wherein said computer readable program code is configured to identify at least one target source-destination node pair via identifying at least one user-specified pair.

11. The computer program product according to claim 8, wherein said computer readable program code is configured to identify at least one target source-destination node pair via consulting historical data.

12. The computer program product according to claim 8, wherein said computer readable program code is configured to generate at least one monitoring rule via:
   defining a minimum capacity cut between nodes in a target source-destination node pair; and
   creating a data tuple which includes at least one member selected from the group consisting of: a capacity of the minimum capacity cut; and sets of vertices on either side of the minimum capacity cut.

13. A method comprising:
   utilizing one or more processors to execute a program of instructions configured to:
   identify at least one financial transaction as being indicative of money laundering by monitoring money flows into and out of a set of target accounts in an evolving money transaction network, thereby reducing a number of transactions to monitor, wherein the identifying comprises implementing a local search-based heuristic across a distributed cloud computing environment, wherein the local search-based heuristic comprises a user providing information regarding the set of target accounts, transactions between the set of target accounts, and a list of network parameters to be monitored, the identifying being performed in view of the local search-based heuristic and comprising:
      identify, for each of the list of network parameters, functions of nodes and edges within a graph representing the money transaction network, wherein the identified functions comprise functions computed efficiently by utilizing a small number of computations across the distributed cloud computing environment;
      identify a locality comprising the set of target accounts depicted as a set of nodes in the graph, wherein the locality is identified via identifying of a set of nodes within a predetermined connective distance of a core node, wherein the edges represent financial transactions between nodes and wherein the edges are weighted based upon a value of the financial transaction, wherein the locality represents a set of nodes identified as possibly engaging in money laundering activities and nodes outside the locality do not present money laundering activities;
      identify, in the locality, at least one target source-destination node pair for monitoring based upon the weighted value of the financial transactions between accounts represented by the node pair at least meeting a predetermined threshold, wherein the at least one target source-destination node pair is specified by a user;
      generate, utilizing the functions, at least one money laundering rule for the monitoring for the identified at least one target source-destination node pair, wherein the generating at least one rule comprises assigning a capacity equal to a monetary transaction value to each transaction between a node pair and computing a minimum capacity cut value between the at least one target source-destination node pair, wherein the minimum capacity cut value corresponds to a monetary value of a largest transaction between the at least one target source-destination node pair; and
      flag, utilizing the functions, at least one incoming financial transaction based upon detecting the at least one incoming financial transaction violates the at least one money laundering rule, wherein detecting the at least one incoming financial transaction violates the at least one money laundering rule comprises identifying that the nodes of the at least one incoming financial transaction corresponding to nodes of the at least one target source-destination node pair and that the sum of the transaction amount of the at least one incoming financial transaction and the minimum capacity cut value for the target source-destination node pair has exceeded a monetary amount previously identified as constituting money laundering;
   update, in response to the detected rule violations: the nodes and edges in the identified locality, the at least one target source destination pair to be monitored, and the cut value of the at least one money laundering rule; and
   iteratively update the at least one money laundering rule based upon a response to the detected rule violations and using the updated at least one money laundering rule in the detecting.

\* \* \* \* \*